United States Patent
Prasad

(10) Patent No.: US 11,639,174 B2
(45) Date of Patent: *May 2, 2023

(54) AUTOMATED SPEED CONTROL SYSTEM

(71) Applicant: Aptiv Technologies Limited, St. Michael (BB)

(72) Inventor: Premchand Krishna Prasad, Westfield, IN (US)

(73) Assignee: Aptiv Technologies Limited, St. Michael (BB)

( * ) Notice: Subject to any disclaimer, the term of this patent is extended or adjusted under 35 U.S.C. 154(b) by 337 days.

This patent is subject to a terminal disclaimer.

(21) Appl. No.: 17/073,231

(22) Filed: Oct. 16, 2020

(65) Prior Publication Data
US 2021/0031766 A1 Feb. 4, 2021

Related U.S. Application Data

(63) Continuation of application No. 15/695,585, filed on Sep. 5, 2017, now Pat. No. 10,850,732.

(51) Int. Cl.
*B60W 30/16* (2020.01)
*B60W 10/06* (2006.01)
(Continued)

(52) U.S. Cl.
CPC .......... *B60W 30/16* (2013.01); *B60W 10/06* (2013.01); *B60W 10/18* (2013.01);
(Continued)

(58) Field of Classification Search
None
See application file for complete search history.

(56) References Cited

U.S. PATENT DOCUMENTS 6,175,799 B1   1/2001   Tsutsumi et al.
7,688,188 B2 *  3/2010   Kume ................ G08G 1/162
                                                 340/995.13
(Continued)

FOREIGN PATENT DOCUMENTS

CN   102971175 A   3/2013
CN   104136296 A   11/2014
(Continued)

OTHER PUBLICATIONS

"Foreign Office Action", CN Application No. 201811032631.6, dated Feb. 23, 2021, 21 pages.
(Continued)

*Primary Examiner* — Jelani A Smith
*Assistant Examiner* — Jacob Daniel Underbakke
(74) *Attorney, Agent, or Firm* — Sawtooth Patent Group PLLC

(57) ABSTRACT

An automated speed control system includes a ranging-sensor, a camera, and a controller. The ranging-sensor detects a lead-speed of a lead-vehicle traveling ahead of a host-vehicle. The camera detects an object in a field-of-view. The controller is in communication with the ranging-sensor and the camera. The controller is operable to control the host-vehicle. The controller determines a change in the lead-speed based on the ranging-sensor. The controller reduces a host-speed of the host-vehicle when the lead-speed is decreasing, no object is detected by the camera, and while a portion of the field-of-view is obscured by the lead-vehicle.

20 Claims, 5 Drawing Sheets

(51) Int. Cl.
*B60W 10/18* (2012.01)
*G08G 1/16* (2006.01)
*B60W 30/14* (2006.01)

(52) U.S. Cl.
CPC ........... *B60W 30/143* (2013.01); *G08G 1/166* (2013.01); *G08G 1/167* (2013.01); *B60W 2420/42* (2013.01); *B60W 2420/52* (2013.01); *B60W 2552/00* (2020.02); *B60W 2554/00* (2020.02); *B60W 2554/804* (2020.02); *B60W 2710/0605* (2013.01); *B60W 2710/18* (2013.01); *B60W 2720/10* (2013.01)

(56) References Cited

U.S. PATENT DOCUMENTS

| | | | |
|---|---|---|---|
| 9,043,129 B2* | 5/2015 | Bonefas | G05D 1/0223 701/300 |
| 9,511,767 B1 | 12/2016 | Okumura et al. | |
| 9,561,796 B2* | 2/2017 | Mielenz | G01S 13/931 |
| 9,707,971 B2 | 7/2017 | Takahashi et al. | |
| 10,850,732 B2 | 12/2020 | Prasad | |
| 2004/0189512 A1* | 9/2004 | Takashima | G01S 13/931 342/55 |
| 2005/0021201 A1* | 1/2005 | Klotz | B60W 30/16 702/189 |
| 2006/0140449 A1 | 6/2006 | Otsuka et al. | |
| 2007/0142995 A1 | 6/2007 | Wotlermann | |
| 2010/0277359 A1 | 11/2010 | Ando | |
| 2010/0315215 A1 | 12/2010 | Yuda | |
| 2012/0314070 A1* | 12/2012 | Zhang | B60W 40/00 348/148 |
| 2013/0060456 A1* | 3/2013 | Pourparhizkar | G08G 1/22 701/117 |
| 2016/0272172 A1 | 9/2016 | Lee | |
| 2016/0272207 A1* | 9/2016 | Dolgov | G01S 13/931 |
| 2017/0076606 A1* | 3/2017 | Gupta | B60K 35/00 |
| 2017/0262727 A1 | 9/2017 | Kozuka et al. | |
| 2017/0327035 A1* | 11/2017 | Keiser | G08G 1/0133 |
| 2018/0151075 A1 | 5/2018 | Claesson | |
| 2018/0218227 A1 | 8/2018 | Takaki et al. | |
| 2019/0071082 A1 | 3/2019 | Prasad | |
| 2019/0279507 A1 | 9/2019 | Ishisaka et al. | |
| 2019/0329768 A1 | 10/2019 | Shalev-Shwartz et al. | |
| 2020/0039510 A1 | 2/2020 | Kume | |

FOREIGN PATENT DOCUMENTS

| | | | |
|---|---|---|---|
| CN | 105151043 A | 12/2015 | |
| CN | 105324804 A | 2/2016 | |
| CN | 205086776 U | 3/2016 | |
| CN | 105774809 A | 7/2016 | |
| CN | 105857315 A | 8/2016 | |
| CN | 105984448 A | 10/2016 | |
| DE | 102016003089 | 9/2016 | |
| EP | 1674883 A2 | 6/2006 | |
| EP | 2806288 A1 | 11/2014 | |
| EP | 3007151 | 4/2016 | |
| EP | 3091370 A1 * | 11/2016 | ......... B60W 30/025 |
| JP | 2004046426 | 2/2004 | |
| JP | 2013086782 A | 5/2013 | |
| JP | 2014180986 A * | 9/2014 | |
| JP | 2017114405 A | 6/2017 | |
| WO | 2005061265 A1 | 7/2005 | |
| WO | 2013124320 | 8/2013 | |

OTHER PUBLICATIONS

"European Search Report", EP Application No. 18192308, dated Jan. 24, 2019, 2 pages.
"Final Office Action", U.S. Appl. No. 15/695,585, dated Apr. 27, 2020, 26 pages.
"Non-Final Office Action", U.S. Appl. No. 15/695,585, dated Dec. 11, 2019, 15 pages.
"Notice of Allowance", U.S. Appl. No. 15/695,585, dated Aug. 21, 2020, 8 Pages.

* cited by examiner

AUTOMATED SPEED CONTROL SYSTEM

CROSS-REFERENCE TO RELATED APPLICATIONS

This application is a continuation of and claims priority to U.S. patent application Ser. No. 15/695,585, filed Sep. 5, 2017, the disclosure of which is incorporated by reference herein in its entirety.

TECHNICAL FIELD OF INVENTION

This disclosure generally relates to a speed control system, and more particularly relates to an automated speed control system that includes situational awareness.

BACKGROUND OF INVENTION

It is known to employ perception systems on autonomous vehicles. Safety issues may arise when other vehicles that do not have vehicle-to-vehicle communication capabilities block a view of the roadway and reduce the effectiveness of on-board perception-sensors.

SUMMARY OF THE INVENTION

In accordance with one embodiment, an automated speed control system for use on an automated vehicle is provided. The automated speed control system includes a ranging-sensor, a camera, and a controller. The ranging-sensor detects a lead-speed of a lead-vehicle traveling ahead of a host-vehicle. The camera detects an object in a field-of-view. The controller is in communication with the ranging-sensor and the camera. The controller is operable to control the host-vehicle. The controller determines a change in the lead-speed based on the ranging-sensor and reduces a host-speed of the host-vehicle when the lead-speed is decreasing, no object is detected by the camera, and while a portion of the field-of-view is obscured by the lead-vehicle.

In another embodiment, an automated speed control system for use on an automated vehicle is provided. The automated speed control system includes a ranging-sensor, a camera, and a controller. The ranging-sensor detects an obstruction on a roadway and a lead-speed of a lead-vehicle traveling on the roadway ahead of a host-vehicle. The camera detects objects in a field-of-view. The controller is in communication with the ranging-sensor and the camera. The controller determines a change in the lead-speed based on the ranging-sensor and reduces a host-speed of the host-vehicle when the lead-speed is decreasing, the obstruction is detected, and the obstruction is not one of the objects detected by the camera.

In yet another embodiment, a method of operating an automated speed control system is provided. The method includes the steps of detecting a lead-speed, detecting an object, determining a change in the lead-speed, and reducing a host-speed. The step of detecting the lead-speed includes detecting, with a ranging-sensor, the lead-speed of a lead-vehicle traveling ahead of a host-vehicle. The step of detecting the object includes detecting, with a camera, the object in a field-of-view. The step of determining the change in the lead-speed includes determining, with a controller in communication with the ranging-sensor and the camera wherein the controller is operable to control the host-vehicle, the change in the lead-speed based on the ranging-sensor. The step of reducing the host-speed includes reducing, with the controller, the host-speed of the host-vehicle when the lead-speed is decreasing, no object is detected by the camera, and while a portion of the field-of-view is obscured by the lead-vehicle.

In yet another embodiment, a method of operating an automated speed control system is provided. The method includes the steps of detecting an obstruction, detecting a lead-speed, detecting objects, determining a change in the lead-speed, and reducing a host-speed. The step of detecting the obstruction includes detecting, with a ranging-sensor, the obstruction on a roadway. The step of detecting the lead-speed includes detecting, with the ranging-sensor, the lead-speed of a lead-vehicle traveling on the roadway ahead of a host-vehicle. The step of detecting objects includes detecting, with a camera, objects in a field-of-view. The step of determining a change in the lead-speed includes determining, with a controller in communication with the ranging-sensor and the camera, the change in the lead-speed based on the ranging-sensor. The step of reducing the host-speed includes reducing, with the controller, the host-speed of the host-vehicle when the lead-speed is decreasing, the obstruction is detected, and the obstruction is not one of the objects detected by the camera.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
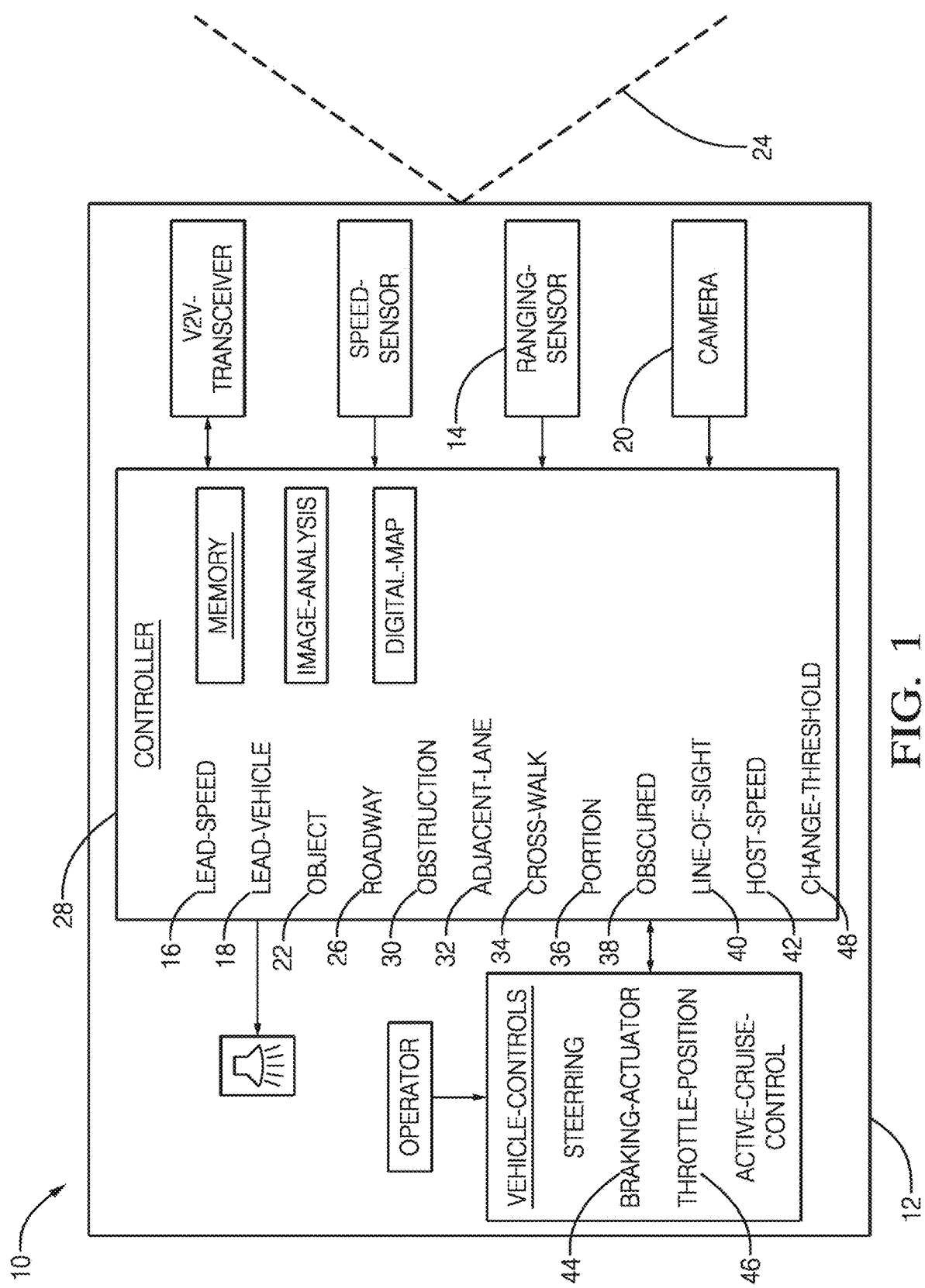
FIG. 1 is an illustration of an automated speed control system in accordance with one embodiment.

FIG. 1 illustrates a non-limiting example of an automated speed control system 10, hereafter referred to as the system 10, for use on an automated vehicle 12, hereafter referred to as a host-vehicle 12. As will be described in more detail below, the system 10 is an improvement over prior speed control systems because the system 10 is configured to use situational awareness when controlling the host-vehicle 12. As used herein, the term 'automated vehicle' is not meant to suggest that fully automated or autonomous operation of the host-vehicle 12 is required. It is contemplated that the teachings presented herein are applicable to instances where the host-vehicle 12 is entirely manually operated by a human and the automation is merely providing emergency vehicle controls to the human.

The system 10 includes a ranging-sensor 14 that detects a lead-speed 16 of a lead-vehicle 18 traveling ahead of a host-vehicle 12. The ranging-sensor 14 may be any of the known ranging-sensors 14, and may include a radar, a lidar, or any combination thereof. The ranging-sensor 14 may be configured to output a continuous or periodic data stream that includes a variety of signal characteristics associated with each target detected. The signal characteristics may include or be indicative of, but are not limited to, the range (not shown) to the detected-target from the host-vehicle 12, the azimuth-angle (not shown) to the detected-target relative to a host-vehicle-longitudinal-axis (not shown), an amplitude (not shown) of the ranging-signal (not shown), and a relative-velocity (not shown) of closure relative to the detected-target. A target is generally detected because the ranging-signal from the detected-target has sufficient signal strength to meet some predetermined threshold. That is, there may be targets that reflect the ranging-signal, but the strength of the ranging-signal is insufficient to be characterized as one of the detected-targets. Data that corresponds to a strong-target will generally be from consistent, non-intermittent signals. However, data that corresponds to a weak-target may be intermittent or have some substantial variability due to a low signal-to-noise ratio.

The system 10 includes a camera 20 that detects an object 22 in a field-of-view 24. The camera 20 may be any of the commercially available cameras 20 suitable for use on the host-vehicle 12. The camera 20 may be mounted on the front of the host-vehicle 12, or mounted in the interior of the host-vehicle 12 at a location suitable for the camera 20 to view the area around the host-vehicle 12 through a windshield of the host-vehicle 12. The camera 20 is preferably a video-type camera 20 or camera 20 that can capture images of a roadway 26 and surrounding area at a sufficient frame-rate, of ten frames per second, for example.

The system 10 also includes a controller 28 in communication with the ranging-sensor 14 and the camera 20, wherein the controller 28 is operable to control the host-vehicle 12. The controller 28 may control vehicle-controls (not specifically shown) such as steering, brakes, and an accelerator. The controller 28 may include a processor (not shown) such as a microprocessor or other control circuitry such as analog and/or digital control circuitry including an application specific integrated circuit (ASIC) for processing data as should be evident to those in the art. The controller 28 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the lead-vehicle 18 and object 22 exist based on signals received by the controller 28 from the ranging-sensor 14 and the camera 20, as described herein.

The controller 28 may analyze a signal from the ranging-sensor 14 to categorize the data from each detected target with respect to a list of previously detected targets having established tracks. As used herein, a track refers to one or more data sets that have been associated with a particular one of the detected targets. By way of example and not limitation, if the amplitude of the signal is above a predetermined amplitude threshold, then the controller 28 determines if the data corresponds to a previously detected target or if a new-target has been detected. If the data corresponds to a previously detected target, the data is added to or combined with prior data to update the track of the previously detected target. If the data does not correspond to any previously detected target because, for example, it is located too far away from any previously detected target, then it may be characterized as a new-target and assigned a unique track identification number. The identification number may be assigned according to the order that data for a new detected target is received, or may be assigned an identification number according to a grid-location (not shown) in a field-of-view 24 of the ranging-sensor 14.

Figure 2:
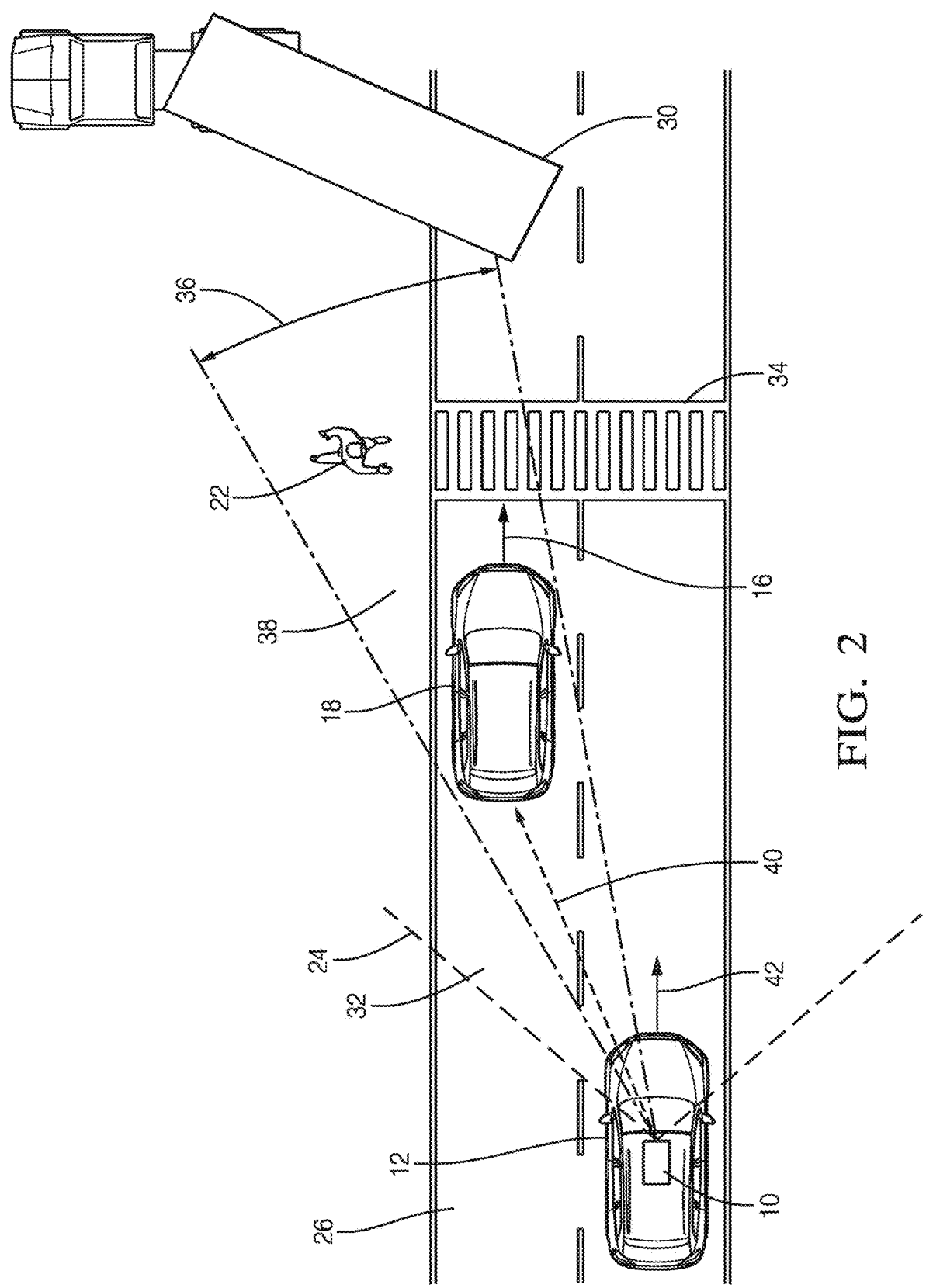
FIG. 2 is an illustration of a host-vehicle equipped with the automated speed control system of FIG. 1 in accordance with another embodiment.

The controller 28 may determine a region-of-interest (not shown) within the field-of-view 24. As illustrated in FIG. 2, the region-of-interest may represent the area directly ahead of the host-vehicle 12 that extends from a left-corner and from a right-corner of the host-vehicle 12. The objects 22 in the region-of-interest and the host-vehicle 12 will collide if the host-vehicle 12 continues to move in the direction of the objects 22. The field-of-view 24 also has a known vertical-angle (not shown) and a known horizontal-angle (not specifically shown) that are design features of the ranging-sensor 14 and determine how close to the host-vehicle 12 the objects 22 may be detected.

The controller 28 may define an occupancy-grid (not shown) that segregates the field-of-view 24 into an array of grid-cells (not shown). As mentioned previously, the controller 28 may assign the identification number to the detected target in the grid-location that is associated with unique grid-cells. A dimension of the individual grid-cell may be of any size and is advantageously not greater than five centimeters (5 cm) on each side.

The controller 28 periodically updates the detections within the grid-cells and determines a repeatability-of-detection of each of the grid-cells based on the reflections detected by the ranging-sensor 14. The repeatability-of-detection corresponds to a history of detections within the grid-cells, where a larger number of detections (i.e. more persistent detections) increases the certainty that the target resides in the occupancy-grid.

The controller 28 may determine that an obstruction 30 (i.e. the guard rail, the tree, a lamp post, a slow or non-moving vehicle, etc.) is present in the field-of-view 24 when each of a string of the grid-cells are characterized by the repeatability-of-detection greater than a repeatability-threshold. Experimentation by the inventors has discovered that the repeatability-threshold of two detections in a grid-cell may be indicative of the presence of the obstruction 30.

FIG. 2 is a top-view of the roadway 26 and illustrates a traffic scenario where the host-vehicle 12 is following the lead-vehicle 18 in an adjacent-lane 32, and the object 22 is a pedestrian that is approaching the roadway 26, as if to cross the roadway 26 at a cross-walk 34. The lead-vehicle 18 is reducing the lead-speed 16 due to the proximity of the pedestrian (i.e. the object 22) to the roadway 26. A portion 36 of the field-of-view 24 is obscured 38 by the lead-vehicle 18. That is, the host-vehicle 12 cannot "see" the pedestrian due to the lead-vehicle 18 blocking a line-of-sight 40 of the system 10. As used herein, obscured 38 includes a partial or a complete blockage of the line-of-site 40 in the field-of-view 24 of the ranging-sensor 14 and/or of the camera 20 and inhibits the ranging-sensor 14 and/or the camera 20 from detecting targets and/or objects 22, and will be understood by those in the art.

The controller 28 determines a change in the lead-speed 16 based on the ranging-sensor 14 and reduces a host-speed 42 of the host-vehicle 12 when the lead-speed 16 is decreasing, no object 22 is detected by the camera 20, and while a portion 36 of the field-of-view 24 is obscured 38 by the lead-vehicle 18, as illustrated in FIG. 2. That is, host-vehicle 12 reduces the host-speed 42 when the system 10 detects that the lead-vehicle 18 is reducing the lead-speed 16 and the pedestrian is not detected by the camera 20 while the lead-vehicle 18 is blocking part of the field-of-view 24.

The system 10 may be particularly beneficial when the lead-vehicle 18 may be traveling in the adjacent-lane 32 of the roadway 26. In the specific example illustrated in FIG. 2, the prior art system would have no reason to reduce the host-speed 42 based on the signals received from the camera 20 and the ranging-sensor 14. In the event that the pedestrian enters the roadway 26 and emerges from the obscured 38 portion 36 of the field-of-view 24, the prior art system will have a reduced time window in which to reduce the host-speed 42, potentially endangering the pedestrian and any surrounding-vehicles. By reducing the host-speed 42 in response to the reduction in the lead-speed 16, the system 10 may increase the time required to react to the pedestrian.

The controller 28 may reduce the host-speed 42 by activating a braking-actuator 44 of the host-vehicle 12, and/or may reduce the host-speed 42 by adjusting a throttle-position 46 of the host-vehicle 12. The controller 28 may further reduce the host-speed 42 when the lead-speed 16 is decreasing by greater than a change-threshold 48. The change-threshold 48 may be user defined and is preferably at least eight kilometers-per-hour (8 kph). The controller 28 may also reduce the host-speed 42 to a value equivalent to the lead-speed 16, or may bring the host-vehicle 12 to a complete stop.

The camera 20 may also detect a marking of the cross-walk 34 on the roadway 26 and the controller 28 may further determine that the marking is the cross-walk 34 using any of the known image-analysis methods (not specifically shown). The marking may be any of the United States Department of Transportation Federal Highway Administration known cross-walk 34 markings, including, but not limited to Solid, Standard, Continental, Dashed, Zebra, and Ladder markings. The cross-walk 34 may also be accompanied by a road-sign (not shown) that may also be detected by the camera 20 as an indication of the presence of the cross-walk 34.

The ranging-sensor 14 may also detect the obstruction 30 on the roadway 26 ahead of the lead-vehicle 18 that may be the slow or non-moving vehicle, as illustrated in FIG. 2. The controller 28 may determine the change in the lead-speed 16 based on the ranging-sensor 14 and reduces the host-speed 42 of the host-vehicle 12 when the lead-speed 16 is decreasing, no object 22 is detected by the camera 20, and while the portion 36 of the field-of-view 24 is obscured 38 by the lead-vehicle 18.

Figure 3:
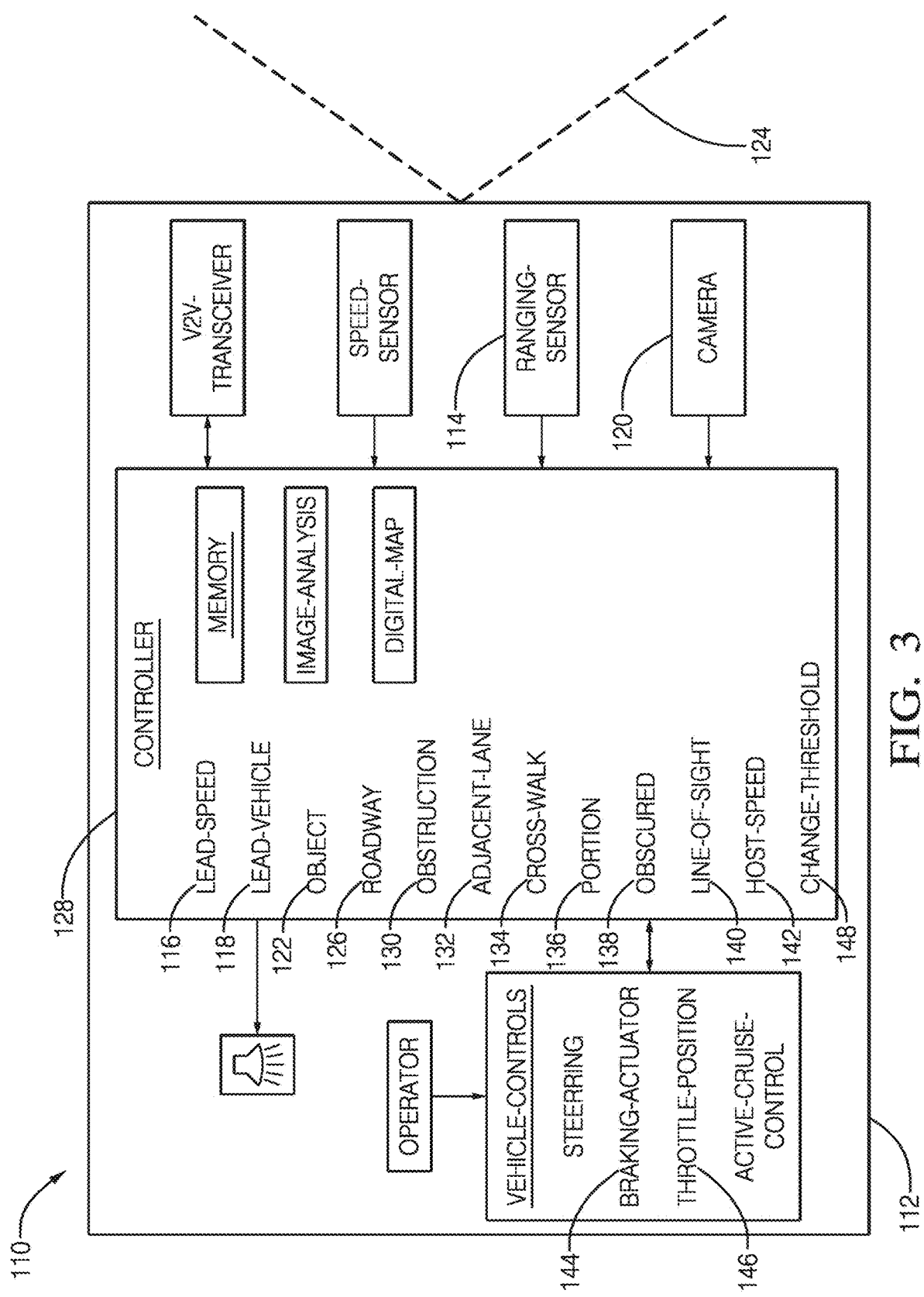
FIG. 3 is an illustration of an automated speed control system in accordance with another embodiment.

FIG. 3 is a non-limiting example of another embodiment of an automated speed control system 110, hereafter referred to as the system 110, for use on an automated vehicle 112, hereafter referred to as a host-vehicle 112. The system 110 includes a ranging-sensor 114 that detects an obstruction 130 on a roadway 126 and a lead-speed 116 of a lead-vehicle 118 traveling on the roadway 126 ahead of the host-vehicle 112. The ranging-sensor 114 may be any of the known ranging-sensors 114, and may include a radar, a lidar, or any combination thereof. The ranging-sensor 114 may be configured to output a continuous or periodic data stream that includes a variety of signal characteristics associated with each target detected. The signal characteristics may include or be indicative of, but are not limited to, the range (not shown) to the detected-target from the host-vehicle 112, the azimuth-angle (not shown) to the detected-target relative to a host-vehicle-longitudinal-axis (not shown), an amplitude (not shown) of the ranging-signal (not shown), and a relative-velocity (not shown) of closure relative to the detected-target. A target is generally detected because the ranging-signal from the detected-target has sufficient signal strength to meet some predetermined threshold. That is, there may be targets that reflect the ranging-signal, but the strength of the ranging-signal is insufficient to be characterized as one of the detected-targets. Data that corresponds to a strong-target will generally be from consistent, non-intermittent signals. However, data that corresponds to a weak-target may be intermittent or have some substantial variability due to a low signal-to-noise ratio.

The system 110 includes a camera 120 that detects objects 122 in a field-of-view 124. The camera 120 may be any of the commercially available cameras 120 suitable for use on the host-vehicle 112. The camera 120 may be mounted on the front of the host-vehicle 112, or mounted in the interior of the host-vehicle 112 at a location suitable for the camera 120 to view the area around the host-vehicle 112 through a windshield of the host-vehicle 112. The camera 120 is preferably a video-type camera 120 or camera 120 that can capture images of a roadway 126 and surrounding area at a sufficient frame-rate, of ten frames per second, for example.

The system 110 also includes a controller 128 in communication with the ranging-sensor 114 and the camera 120, wherein the controller 128 is operable to control the host-vehicle 112. The controller 128 may control vehicle-controls (not specifically shown) such as steering, brakes, and an accelerator. The controller 128 may include a processor (not shown) such as a microprocessor or other control circuitry such as analog and/or digital control circuitry including an application specific integrated circuit (ASIC) for processing data as should be evident to those in the art. The controller 128 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the lead-vehicle 118, the object 122, and the obstruction 130 exist based on signals received by the controller 128 from the ranging-sensor 114 and the camera 120, as described herein.

The controller 128 may analyze a signal from the ranging-sensor 114 to categorize the data from each detected target with respect to a list of previously detected targets having established tracks. As used herein, a track refers to one or more data sets that have been associated with a particular one of the detected targets. By way of example and not limitation, if the amplitude of the signal is above a predetermined amplitude threshold, then the controller 128 determines if the data corresponds to a previously detected target or if a new-target has been detected. If the data corresponds to a previously detected target, the data is added to or combined with prior data to update the track of the previously detected target. If the data does not correspond to any previously detected target because, for example, it is located too far away from any previously detected target, then it may be characterized as a new-target and assigned a unique track identification number. The identification number may be assigned according to the order that data for a new detected target is received, or may be assigned an identification number according to a grid-location (not shown) in a field-of-view 124 of the ranging-sensor 114.

Figure 4:
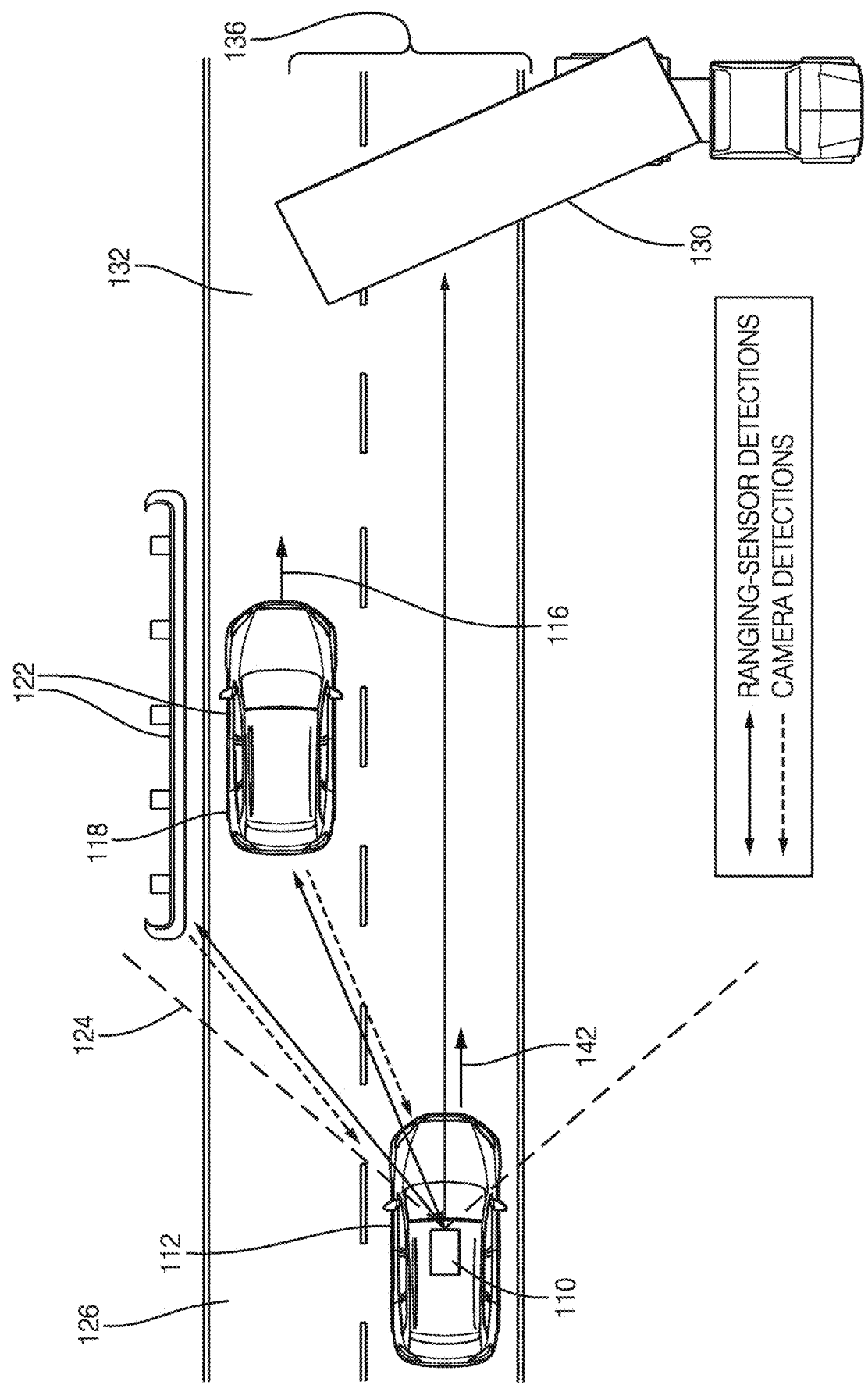
FIG. 4 is an illustration of a host-vehicle equipped with the automated speed control system of FIG. 3 in accordance with another embodiment.

The controller 128 may determine a region-of-interest (not shown) within the field-of-view 124. As illustrated in FIG. 4, the region-of-interest may represent the area directly ahead of the host-vehicle 112 that extends from a left-corner and from a right-corner of the host-vehicle 112. The objects 122 in the region-of-interest and the host-vehicle 112 will collide if the host-vehicle 112 continues to move in the direction of the objects 122. The field-of-view 124 also has a known vertical-angle (not shown) and a known horizontal-angle (not specifically shown) that are design features of the ranging-sensor 114 and determine how close to the host-vehicle 112 the objects 122 may be detected.

The controller 128 may define an occupancy-grid (not shown) that segregates the field-of-view 124 into an array of grid-cells (not shown). As mentioned previously, the controller 128 may assign the identification number to the detected target in the grid-location that is associated with unique grid-cells. A dimension of the individual grid-cell may be of any size and is advantageously not greater than five centimeters (5 cm) on each side.

The controller 128 periodically updates the detections within the grid-cells and determines a repeatability-of-detection of each of the grid-cells based on the reflections detected by the ranging-sensor 114. The repeatability-of-detection corresponds to a history of detections within the grid-cells, where a larger number of detections (i.e. more persistent detections) increases the certainty that the target resides in the occupancy-grid.

The controller 128 may determine that an obstruction 130 (i.e. a slow or non-moving vehicle) is present in the field-of-view 124 when each of a string of the grid-cells are characterized by the repeatability-of-detection greater than a repeatability-threshold. Experimentation by the inventors has discovered that the repeatability-threshold of two detections in a grid-cell may be indicative of the presence of the obstruction 130.

FIG. 4 is a top-view of the roadway 126 and illustrates a traffic scenario where the host-vehicle 112 is following the lead-vehicle 118 in an adjacent-lane 132, and the objects 122 are a guard rail beside the roadway 126 and the lead-vehicle 118 that are detected by the camera 120 and the ranging-sensor 114. The obstruction 130 is illustrated as a truck that is detected by the ranging-sensor 114 and not detected by the camera 120. Without subscribing to any particular theory, it is believed that camera 120 is unable to detect the obstruction 130 due to the camera's 120 inability to distinguish the truck from a background. That is, the camera 120 may not "see" the truck because there is not sufficient contrast between the image of the truck and the image of the horizon as detected by the camera 120. The truck is also blocking a portion 136 of the roadway 126 and the lead-vehicle 118 is reducing the lead-speed 116 due to its proximity to the truck (i.e. the obstruction 130) on the roadway 126.

The controller 128 determines a change in the lead-speed 116 based on the ranging-sensor 114 and reduces a host-speed 142 of the host-vehicle 112 when the lead-speed 116 is decreasing, the obstruction 130 is detected, and the obstruction 130 is not one of the objects 122 detected by the camera 120, as illustrated in FIG. 4.

The system 110 is particularly beneficial when the lead-vehicle 118 may be traveling in the adjacent-lane 132 of the roadway 126. In the specific example illustrated in FIG. 4, the prior art system would typically not reduce the host-speed 142 based on the conflicting signals received from the camera 120 and the ranging-sensor 114. If the obstruction 130 does not clear the roadway 126, the prior art system will have a reduced time window in which to reduce the host-speed 142, potentially endangering the host-vehicle 112, the obstruction 130, and any surrounding-vehicles. By reducing the host-speed 142 in response to the reduction in the lead-speed 116, the system 110 may increase the time required to react to the obstruction 130, and may avoid a collision with the obstruction 130.

The controller 128 may reduce the host-speed 142 by activating a braking-actuator 144 of the host-vehicle 112, and/or may reduce the host-speed 142 by adjusting a throttle-position 146 of the host-vehicle 112. The controller 128 may further reduce the host-speed 142 when the lead-speed 116 is decreasing by greater than a change-threshold 148. The change-threshold 148 may be user defined and is preferably at least eight kilometers-per-hour (8 kph). The controller 128 may also reduce the host-speed 142 to a value equivalent to the lead-speed 116, or may bring the host-vehicle 112 to a complete stop.

Figure 5:
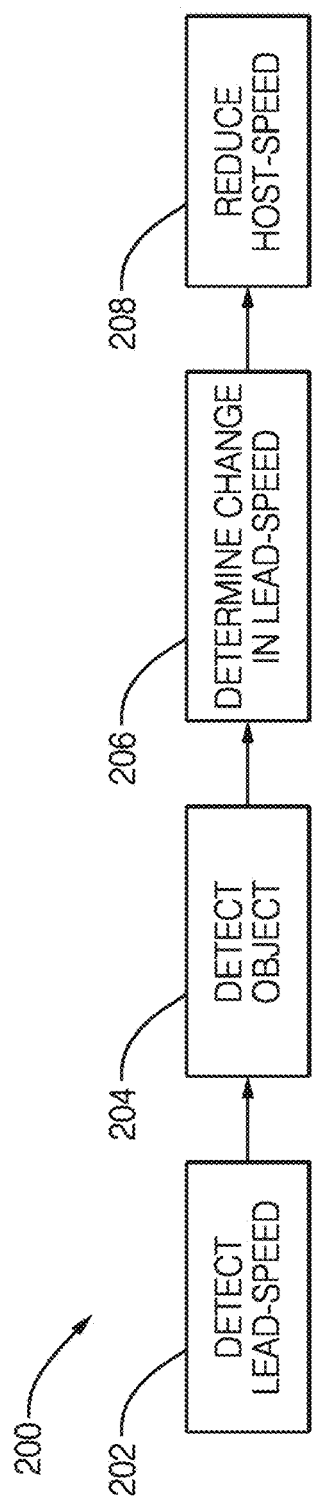
FIG. 5 is an illustration of a method of operating the automated speed control system of FIG. 1 in accordance with yet another embodiment.

FIG. 5 illustrates a non-limiting example of yet another embodiment of a method 200 of operating an automated speed control system 10, hereafter referred to as the system 10, for use on an automated vehicle 12, hereafter referred to as a host-vehicle 12.

Step 202, DETECT LEAD-SPEED, may include detecting, with a ranging-sensor 14, a lead-speed 16 of a lead-vehicle 18 traveling ahead of a host-vehicle 12. The ranging-sensor 14 may be any of the known ranging-sensors 14, and may include a radar, a lidar, or any combination thereof. The ranging-sensor 14 may be configured to output a continuous or periodic data stream that includes a variety of signal characteristics associated with each target detected. The signal characteristics may include or be indicative of, but are not limited to, the range (not shown) to the detected-target from the host-vehicle 12, the azimuth-angle (not shown) to the detected-target relative to a host-vehicle-longitudinal-axis (not shown), an amplitude (not shown) of the ranging-signal (not shown), and a relative-velocity (not shown) of closure relative to the detected-target. A target is generally detected because the ranging-signal from the detected-target has sufficient signal strength to meet some predetermined threshold. That is, there may be targets that reflect the ranging-signal, but the strength of the ranging-signal is insufficient to be characterized as one of the detected-targets. Data that corresponds to a strong-target will generally be from consistent, non-intermittent signals. However, data that corresponds to a weak-target may be intermittent or have some substantial variability due to a low signal-to-noise ratio.

Step 204, DETECT OBJECT, may include detecting, with a camera 20, an object 22 in a field-of-view 24. The camera 20 may be any of the commercially available cameras 20 suitable for use on the host-vehicle 12. The camera 20 may be mounted on the front of the host-vehicle 12, or mounted in the interior of the host-vehicle 12 at a location suitable for the camera 20 to view the area around the host-vehicle 12 through a windshield of the host-vehicle 12. The camera 20 is preferably a video-type camera 20 or camera 20 that can capture images of a roadway 26 and surrounding area at a sufficient frame-rate, of ten frames per second, for example.

Step 206, DETERMINE CHANGE IN LEAD-SPEED, may include determining, with a controller 28 in communication with the ranging-sensor 14 and the camera 20, wherein the controller 28 is operable to control the host-vehicle 12, a change in the lead-speed 16 based on the ranging-sensor 14. The controller 28 may control vehicle-controls (not specifically shown) such as steering, brakes, and an accelerator. The controller 28 may include a processor (not shown) such as a microprocessor or other control circuitry such as analog and/or digital control circuitry including an application specific integrated circuit (ASIC) for processing data as should be evident to those in the art. The controller 28 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the lead-vehicle 18 and object 22 exist based on signals received by the controller 28 from the ranging-sensor 14 and the camera 20, as described herein.

The controller 28 may analyze a signal from the ranging-sensor 14 to categorize the data from each detected target with respect to a list of previously detected targets having established tracks. As used herein, a track refers to one or more data sets that have been associated with a particular one of the detected targets. By way of example and not limitation, if the amplitude of the signal is above a predetermined amplitude threshold, then the controller 28 determines if the data corresponds to a previously detected target or if a new-target has been detected. If the data corresponds to a previously detected target, the data is added to or combined with prior data to update the track of the previously detected target. If the data does not correspond to any previously detected target because, for example, it is located too far away from any previously detected target, then it may be characterized as a new-target and assigned a unique track identification number. The identification number may be assigned according to the order that data for a new detected target is received, or may be assigned an identification number according to a grid-location (not shown) in a field-of-view 24 of the ranging-sensor 14.

The controller 28 may determine a region-of-interest (not shown) within the field-of-view 24. As illustrated in FIG. 2, the region-of-interest may represent the area directly ahead of the host-vehicle 12 that extends from a left-corner and from a right-corner of the host-vehicle 12. The objects 22 in the region-of-interest and the host-vehicle 12 will collide if the host-vehicle 12 continues to move in the direction of the objects 22. The field-of-view 24 also has a known vertical-angle (not shown) and a known horizontal-angle (not specifically shown) that are design features of the ranging-sensor 14 and determine how close to the host-vehicle 12 the objects 22 may be detected.

The controller 28 may define an occupancy-grid (not shown) that segregates the field-of-view 24 into an array of grid-cells (not shown). As mentioned previously, the controller 28 may assign the identification number to the detected target in the grid-location that is associated with unique grid-cells. A dimension of the individual grid-cell may be of any size and is advantageously not greater than five centimeters (5 cm) on each side.

The controller 28 periodically updates the detections within the grid-cells and determines a repeatability-of-detection of each of the grid-cells based on the reflections detected by the ranging-sensor 14. The repeatability-of-detection corresponds to a history of detections within the grid-cells, where a larger number of detections (i.e. more persistent detections) increases the certainty that the target resides in the occupancy-grid.

The controller 28 may determine that an obstruction 30 (i.e. the guard rail, the tree, a lamp post, a slow or non-moving vehicle, etc.) is present in the field-of-view 24 when each of a string of the grid-cells are characterized by the repeatability-of-detection greater than a repeatability-threshold. Experimentation by the inventors has discovered that the repeatability-threshold of two detections in a grid-cell may be indicative of the presence of the obstruction 30.

FIG. 2 is a top-view of the roadway 26 and illustrates a traffic scenario where the host-vehicle 12 is following the lead-vehicle 18 in an adjacent-lane 32, and the object 22 is a pedestrian that is approaching the roadway 26, as if to cross the roadway 26 at a cross-walk 34. The lead-vehicle 18 is reducing the lead-speed 16 due to the proximity of the pedestrian (i.e. the object 22) to the roadway 26. A portion 36 of the field-of-view 24 is obscured 38 by the lead-vehicle 18. That is, the host-vehicle 12 cannot "see" the pedestrian due to the lead-vehicle 18 blocking a line-of-sight 40 of the system 10. As used herein, obscured 38 includes a partial or a complete blockage of the line-of-site 40 in the field-of-view 24 of the ranging-sensor 14 and/or the camera 20 and inhibits the ranging-sensor 14 and the camera 20 from detecting targets and/or objects 22, and will be understood by those in the art.

Step 208, REDUCE HOST-SPEED, may include reducing, with the controller 28, a host-speed 42 of the host-vehicle 12 when the lead-speed 16 is decreasing, no object 22 is detected by the camera 20, and while a portion 36 of the field-of-view 24 is obscured 38 by the lead-vehicle 18, as illustrated in FIG. 2. That is, host-vehicle 12 reduces the host-speed 42 when the system 10 detects that the lead-vehicle 18 is reducing the lead-speed 16 and the pedestrian is not detected by the camera 20 while the lead-vehicle 18 is blocking part of the field-of-view 24.

The system 10 may be particularly beneficial when the lead-vehicle 18 may be traveling in the adjacent-lane 32 of the roadway 26. In the specific example illustrated in FIG. 2, the prior art system would have no reason to reduce the host-speed 42 based on the signals received from the camera 20 and the ranging-sensor 14. In the event that the pedestrian enters the roadway 26 and emerges from the obscured 38 portion 36 of the field-of-view 24, the prior art system will have a reduced time window in which to reduce the host-speed 42, potentially endangering the pedestrian and any surrounding-vehicles (not shown). By reducing the host-speed 42 in response to the reduction in the lead-speed 16, the system 10 may increase the time required to react to the pedestrian.

The controller 28 may reduce the host-speed 42 by activating a braking-actuator 44 of the host-vehicle 12, and/or may reduce the host-speed 42 by adjusting a throttle-position 46 of the host-vehicle 12. The controller 28 may further reduce the host-speed 42 when the lead-speed 16 is decreasing by greater than a change-threshold 48. The change-threshold 48 may be user defined and is preferably at least eight kilometers-per-hour (8 kph). The controller 28 may also reduce the host-speed 42 to a value equivalent to the lead-speed 16, or may bring the host-vehicle 12 to a complete stop.

The camera 20 may also detect a marking of the cross-walk 34 on the roadway 26 and the controller 28 may further determine that the marking is the cross-walk 34 using any of the known image-analysis methods (not specifically shown). The marking may be any of the United States Department of Transportation Federal Highway Administration known cross-walk 34 markings, including, but not limited to Solid, Standard, Continental, Dashed, Zebra, and Ladder markings. The cross-walk 34 may also be accompanied by a road-sign (not shown) that may also be detected by the camera 20 as an indication of the presence of the cross-walk 34.

The ranging-sensor 14 may also detect the obstruction 30 on the roadway 26 ahead of the lead-vehicle 18 that may be the slow or non-moving vehicle, as illustrated in FIG. 2. The controller 28 may determine the change in the lead-speed 16 based on the ranging-sensor 14 and reduces the host-speed 42 of the host-vehicle 12 when the lead-speed 16 is decreasing, no object 22 is detected by the camera 20, and while the portion 36 of the field-of-view 24 is obscured 38 by the lead-vehicle 18.

Figure 6:
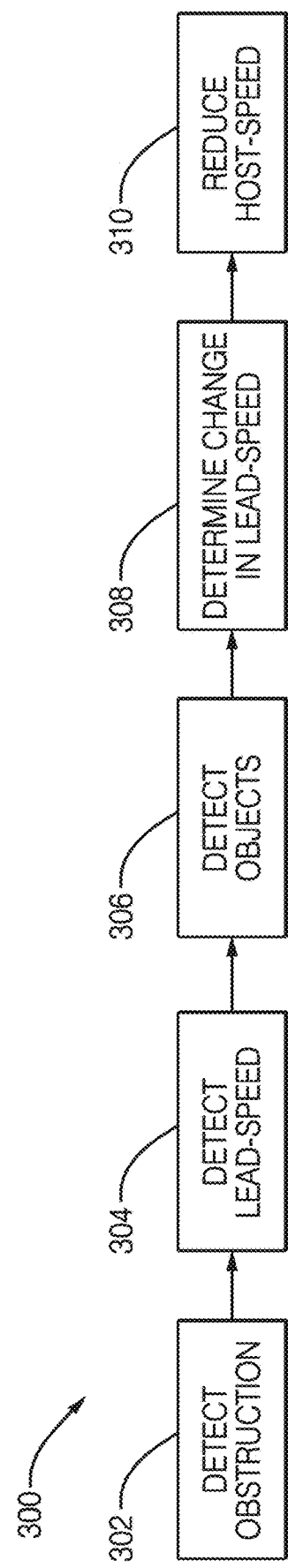
FIG. 6 is an illustration of a method of operating the automated speed control system of FIG. 3 in accordance with yet another embodiment.

FIG. 6 illustrates a non-limiting example of yet another embodiment of a method 300 of operating an automated speed control system 110, hereafter referred to as the system 110, for use on an automated vehicle 112, hereafter referred to as a host-vehicle 112.

Step 302, DETECT OBSTRUCTION, may include detecting, with a ranging-sensor 114, an obstruction 130 on a roadway 126 ahead of the host-vehicle 112. The ranging-sensor 114 may be any of the known ranging-sensors 114, and may include a radar, a lidar, or any combination thereof. The ranging-sensor 114 may be configured to output a continuous or periodic data stream that includes a variety of signal characteristics associated with each target detected. The signal characteristics may include or be indicative of, but are not limited to, the range (not shown) to the detected-target from the host-vehicle 112, the azimuth-angle (not shown) to the detected-target relative to a host-vehicle-longitudinal-axis (not shown), an amplitude (not shown) of the ranging-signal (not shown), and a relative-velocity (not shown) of closure relative to the detected-target. A target is generally detected because the ranging-signal from the detected-target has sufficient signal strength to meet some predetermined threshold. That is, there may be targets that reflect the ranging-signal, but the strength of the ranging-signal is insufficient to be characterized as one of the detected-targets. Data that corresponds to a strong-target will generally be from consistent, non-intermittent signals. However, data that corresponds to a weak-target may be intermittent or have some substantial variability due to a low signal-to-noise ratio.

Step 304, DETECT LEAD-SPEED, may include detecting, with the ranging-sensor 114, a lead-speed 116 of the lead-vehicle 118 traveling on the roadway 126 ahead of the host-vehicle 112.

Step 306, DETECT OBJECTS, may include detecting, with a camera 120, objects 122 in a field-of-view 124. The camera 120 may be any of the commercially available cameras 120 suitable for use on the host-vehicle 112. The camera 120 may be mounted on the front of the host-vehicle 112, or mounted in the interior of the host-vehicle 112 at a location suitable for the camera 120 to view the area around the host-vehicle 112 through a windshield of the host-vehicle 112. The camera 120 is preferably a video-type camera 120 or camera 120 that can capture images of a roadway 126 and surrounding area at a sufficient frame-rate, of ten frames per second, for example.

Step 308, DETERMINE CHANGE IN LEAD-SPEED, may include determining, with a controller 128 in communication with the ranging-sensor 114 and the camera 120, wherein the controller 128 is operable to control the host-vehicle 112, a change in the lead-speed 116 based on the ranging-sensor 114. The controller 128 may control vehicle-controls (not specifically shown) such as steering, brakes, and an accelerator. The controller 128 may include a processor (not shown) such as a microprocessor or other control circuitry such as analog and/or digital control circuitry including an application specific integrated circuit (ASIC) for processing data as should be evident to those in the art. The controller 128 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the lead-vehicle 118, the object 122, and the obstruction 130 exist based on signals received by the controller 128 from the ranging-sensor 114 and the camera 120, as described herein.

The controller 128 may analyze a signal from the ranging-sensor 114 to categorize the data from each detected target with respect to a list of previously detected targets having established tracks. As used herein, a track refers to one or more data sets that have been associated with a particular one of the detected targets. By way of example and not limitation, if the amplitude of the signal is above a predetermined amplitude threshold, then the controller 128 determines if the data corresponds to a previously detected target or if a new-target has been detected. If the data corresponds to a previously detected target, the data is added to or combined with prior data to update the track of the previously detected target. If the data does not correspond to any previously detected target because, for example, it is located too far away from any previously detected target, then it may be characterized as a new-target and assigned a unique track identification number. The identification number may be assigned according to the order that data for a new detected target is received, or may be assigned an identification number according to a grid-location (not shown) in a field-of-view 124 of the ranging-sensor 114.

The controller 128 may determine a region-of-interest (not shown) within the field-of-view 124. As illustrated in FIG. 4, the region-of-interest may represent the area directly ahead of the host-vehicle 112 that extends from a left-corner and from a right-corner of the host-vehicle 112. The objects 122 in the region-of-interest and the host-vehicle 112 will collide if the host-vehicle 112 continues to move in the direction of the objects 122. The field-of-view 124 also has a known vertical-angle (not shown) and a known horizontal-angle (not specifically shown) that are design features of the ranging-sensor 114 and determine how close to the host-vehicle 112 the objects 122 may be detected.

The controller 128 may define an occupancy-grid (not shown) that segregates the field-of-view 124 into an array of grid-cells (not shown). As mentioned previously, the controller 128 may assign the identification number to the detected target in the grid-location that is associated with unique grid-cells. A dimension of the individual grid-cell may be of any size and is advantageously not greater than five centimeters (5 cm) on each side.

The controller 128 periodically updates the detections within the grid-cells and determines a repeatability-of-detection of each of the grid-cells based on the reflections detected by the ranging-sensor 114. The repeatability-of-detection corresponds to a history of detections within the grid-cells, where a larger number of detections (i.e. more persistent detections) increases the certainty that the target resides in the occupancy-grid.

The controller 128 may determine that an obstruction 130 (i.e. a slow or non-moving vehicle) is present in the field-of-view 124 when each of a string of the grid-cells are characterized by the repeatability-of-detection greater than a repeatability-threshold. Experimentation by the inventors has discovered that the repeatability-threshold of two detections in a grid-cell may be indicative of the presence of the obstruction 130.

FIG. 4 is a top-view of the roadway 126 and illustrates a traffic scenario where the host-vehicle 112 is following the lead-vehicle 118 in an adjacent-lane 132, and the objects 122 are a guard rail beside the roadway 126 and the lead-vehicle 118 that are detected by the camera 120 and the ranging-sensor 114. The obstruction 130 is illustrated as a truck that is detected by the ranging-sensor 114 and not detected by the camera 120. Without subscribing to any particular theory, it is believed that camera 120 is unable to detect the obstruction 130 due to the camera's 120 inability to distinguish the truck from a background. That is, the camera 120 may not "see" the truck because there is not sufficient contrast between the image of the truck and the image of the horizon as detected by the camera 120. The truck is also blocking a portion 136 of the roadway 126 and the lead-vehicle 118 is reducing the lead-speed 116 due to its proximity to the truck (i.e. the obstruction 130) on the roadway 126.

Step 310, REDUCE HOST-SPEED, may include reducing, with the controller 128, a host-speed 142 of the host-vehicle 112 when the lead-speed 116 is decreasing, the obstruction 130 is detected, and the obstruction 130 is not one of the objects 122 detected by the camera 120, as illustrated in FIG. 4.

The system 110 is particularly beneficial when the lead-vehicle 118 may be traveling in the adjacent-lane 132 of the roadway 126. In the specific example illustrated in FIG. 4, the prior art system would typically not reduce the host-speed 142 based on the conflicting signals received from the camera 120 and the ranging-sensor 114. If the obstruction 130 does not clear the roadway 126, the prior art system will have a reduced time window in which to reduce the host-speed 142, potentially endangering the host-vehicle 112, the obstruction 130, and any surrounding-vehicles. By reducing the host-speed 142 in response to the reduction in the lead-speed 116, the system 110 may increase the time required to react to the obstruction 130, and may avoid a collision with the obstruction 130.

The controller 128 may reduce the host-speed 142 by activating a braking-actuator 144 of the host-vehicle 112, and/or may reduce the host-speed 142 by adjusting a throttle-position 146 of the host-vehicle 112. The controller 128 may further reduce the host-speed 142 when the lead-speed 116 is decreasing by greater than a change-threshold 148. The change-threshold 148 may be user defined and is preferably at least eight kilometers-per-hour (8 kph). The controller 128 may also reduce the host-speed 142 to a value equivalent to the lead-speed 116, or may bring the host-vehicle 112 to a complete stop.

Accordingly, an automated speed control system 10 (the system 10), a controller 28 for the system 10, and a method 200 of operating the system 10 are provided. The system 10 is an improvement over the prior art systems because the system 10 detects when the lead-vehicle 18 is reducing the lead-speed 16 and reduces the host-speed 42 when the object 22 is obscured 36 in the field-of-view 24.

While this invention has been described in terms of the preferred embodiments thereof, it is not intended to be so limited, but rather only to the extent set forth in the claims that follow.

What is claimed is:

1. A method comprising:
  receiving, by a controller of a host vehicle and from a ranging sensor, signal characteristics associated with a lead vehicle traveling ahead of the host vehicle in a lane adjacent to that of the host vehicle;
  receiving, from a camera that is local to the host vehicle, images; and
  decreasing, by the controller, a speed of the host vehicle responsive to determining that:
    a speed of the lead vehicle has decreased an amount based on the signal characteristics received from the ranging sensor;
    an object exists in front of the host vehicle based on one or more of the images; and
    a portion of interest within the one or more of the images is occluded by the lead vehicle, the portion of interest corresponding to a portion of the object.

2. The method of claim 1, wherein the amount corresponds to a change threshold.

3. The method of claim 1, wherein the decreasing the speed of the host vehicle comprises decreasing the speed of the host vehicle to match the speed of the lead vehicle.

4. The method of claim 1, wherein the decreasing the speed of the host vehicle comprises stopping the host vehicle.

5. The method of claim 1, wherein the decreasing the speed of the host vehicle comprises:
  activating a braking-actuator of the host vehicle; or
  adjusting an accelerator position of the host vehicle.

6. The method of claim 1, wherein the signal characteristics are radar or lidar characteristics.

7. The method of claim 1, further comprising:
  identifying the object within the one or more of the images; and
  defining the portion of interest based on the identifying the object.

8. The method of claim 7, wherein:
  the object is a crosswalk; and
  the portion of interest corresponds to an end of the crosswalk.

9. The method of claim 1, wherein the ranging sensor is local to the host vehicle.

10. The method of claim 8, wherein the identifying the crosswalk is based on a sign detected in the one or more of the images.

11. A method comprising:
  receiving, by a controller of a host vehicle and from a ranging sensor, signal characteristics associated with objects around the host vehicle;
  receiving, from a camera that is local to the host vehicle, images; and
  decreasing, by the controller, a speed of the host vehicle responsive to determining that:
    a speed of a lead vehicle in a lane adjacent to that of the host vehicle has decreased by an amount based on the signal characteristics received from the ranging sensor;
    an obstruction exists ahead of the host vehicle in a path of the host vehicle based on the signal characteristics received from the ranging sensor;
    the obstruction cannot be determined within one or more of the images received from the camera; and
    a conflict exists between the signal characteristics and the images regarding the obstruction.

12. The method of claim 11, wherein the signal characteristics are radar or lidar characteristics.

13. The method of claim 11, wherein the obstruction cannot be determined within the one or more of the images based on a color of the obstruction.

14. The method of claim 13, wherein the color of the obstruction corresponds to a color of a horizon or sky.

15. The method of claim 11, wherein determining the obstruction comprises determining that an object exists at or near a road level in the path of the host vehicle.

16. The method of claim 11, wherein the amount corresponds to a change threshold.

17. The method of claim 11, wherein the decreasing the speed of the host vehicle comprises decreasing the speed of the host vehicle to match the speed of the lead vehicle.

18. The method of claim 11, wherein the decreasing the speed of the host vehicle comprises stopping the host vehicle.

19. The method of claim 11, wherein the decreasing the speed of the host vehicle comprises:
   activating a braking-actuator of the host vehicle; or
   adjusting an accelerator position of the host vehicle.

20. A method comprising:
   receiving, by a controller of a host vehicle and from a ranging sensor, signal characteristics associated with objects surrounding the host vehicle;
   receiving, from a camera that is local to the host vehicle, images; and
   decreasing, by the controller, a speed of the host vehicle responsive to determining that:
      a speed of a lead vehicle traveling ahead of the host vehicle in a lane adjacent to that of the host vehicle has decreased an amount based on the signal characteristics received from the ranging sensor;
      an object exists in front of the host vehicle based on the signal characteristic received from the ranging sensor; and
      a portion of interest corresponding to a location of the object is occluded by the lead vehicle in one or more of the images received by the camera.

* * * * *